US009557726B2

(12) United States Patent
Inamoto

(10) Patent No.: US 9,557,726 B2
(45) Date of Patent: Jan. 31, 2017

(54) LADDER PROGRAM DISPLAY DEVICE AND LADDER PROGRAM DISPLAY METHOD

(71) Applicant: Kazumasa Inamoto, Tokyo (JP)

(72) Inventor: Kazumasa Inamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/443,808

(22) PCT Filed: Nov. 26, 2012

(86) PCT No.: PCT/JP2012/080513
§ 371 (c)(1),
(2) Date: May 19, 2015

(87) PCT Pub. No.: WO2014/080531
PCT Pub. Date: May 30, 2014

(65) Prior Publication Data
US 2015/0338973 A1 Nov. 26, 2015

(51) Int. Cl.
*G09G 5/00* (2006.01)
*G05B 19/05* (2006.01)
(Continued)

(52) U.S. Cl.
CPC .......... *G05B 19/05* (2013.01); *G05B 19/0426* (2013.01); *G06F 1/1626* (2013.01); *G06F 1/1694* (2013.01);
(Continued)

(58) Field of Classification Search
None
See application file for complete search history.

(56) References Cited

U.S. PATENT DOCUMENTS 5,586,335 A * 12/1996 Utan ................ G05B 19/056
700/18
7,603,183 B1 * 10/2009 Munemoto ............ G05B 19/05
700/17
(Continued)

FOREIGN PATENT DOCUMENTS

DE 60015967 T2 12/2005
JP 04-163578 A 6/1992
(Continued)

OTHER PUBLICATIONS

Communication dated Jun. 29, 2015 from the Taiwan Intellectual Property Office in counterpart application No. 102117336.
(Continued)

*Primary Examiner* — Ryan M Gray
(74) *Attorney, Agent, or Firm* — Sughrue Mion, PLLC; Richard C. Turner

(57) ABSTRACT

A ladder program display device includes: a display-direction determining unit that determines whether a ladder program is caused to be displayed in a display direction that is vertically displayed writing or horizontally displayed writing; and a display unit that displays the ladder program vertically or horizontally in accordance with an instruction from the display-direction determining unit, wherein the display-direction determining unit compares how a ladder program is displayed in a case of vertically displayed writing and how a ladder program is displayed in a case of horizontally displayed writing for each orientation of the display unit that is a portrait-oriented state or a landscape-oriented state, selects a display direction in accordance with the orientation based on a comparison result, and instructs the display unit to display a ladder program in selected display direction.

14 Claims, 15 Drawing Sheets

(51) Int. Cl.
*G06F 1/16* (2006.01)
*G05B 19/042* (2006.01)
*G06F 3/048* (2013.01)
*G06T 3/60* (2006.01)
*G06T 11/60* (2006.01)
*G06T 3/40* (2006.01)

(52) U.S. Cl.
CPC ............... *G06F 3/048* (2013.01); *G09G 5/00* (2013.01); *G06F 2200/1614* (2013.01); *G06T 3/40* (2013.01); *G06T 3/60* (2013.01); *G06T 11/60* (2013.01)

(56) References Cited

U.S. PATENT DOCUMENTS

| | | | | |
|---|---|---|---|---|
| 2009/0207184 | A1* | 8/2009 | Laine | G06F 1/1626 345/619 |
| 2010/0066763 | A1* | 3/2010 | MacDougall | G06F 1/1626 345/656 |
| 2010/0088639 | A1* | 4/2010 | Yach | G06F 1/1626 715/825 |
| 2013/0141464 | A1* | 6/2013 | Hunt | G06F 1/1626 345/659 |
| 2013/0239063 | A1* | 9/2013 | Ubillos | H04L 51/24 715/838 |
| 2013/0271493 | A1* | 10/2013 | Shiroor | G09G 5/00 345/635 |

FOREIGN PATENT DOCUMENTS

| | | |
|---|---|---|
| JP | 05-074935 A | 3/1993 |
| JP | 2000-059474 A | 2/2000 |
| JP | 2002-182712 A | 6/2002 |
| JP | 2003-030263 A | 1/2003 |
| JP | 2003-108131 A | 4/2003 |
| JP | 2004-046421 A | 2/2004 |
| JP | 2005-092807 A | 4/2005 |
| JP | 2006-285176 A | 10/2006 |
| JP | 2008-282260 A | 11/2008 |
| JP | 2009-136663 A | 6/2009 |
| JP | 2009-259081 A | 11/2009 |
| WO | 0068766 A1 | 11/2000 |

OTHER PUBLICATIONS

Japanese Office Action for Corresponding JP2014-548424 dated Jan. 9, 2015.
Kazumori IDE, "Sequence Seigyo" no Kihon Kikai to Program de Jitsugen suru Seigyo no Sekai, 1st edition, Softbank creative Corp., Nov. 25, 2010, pp. 174-175.
International Search Report for PCT/JP2012/080513 dated Feb. 12, 2013.
Communication dated Feb. 1, 2016, issued by the German Patent Office in counterpart German Application No. 112012007174.3.
Communication dated Aug. 3, 2016 from the Korean Intellectual Property Office in counterpart Application No. 10-2015-7015284.

* cited by examiner

LADDER PROGRAM DISPLAY DEVICE AND LADDER PROGRAM DISPLAY METHOD

FIELD

The present invention relates to a ladder program display device that displays a ladder program and a ladder program display method.

BACKGROUND

Devices that display ladder programs include, for example, tablet terminals. Tablet terminals include terminals that automatically detect whether they are oriented in portrait orientation or landscape orientation and switch the display screen in accordance with the direction in which the terminals are orientated (orientation).

For example, when a tablet terminal has a rectangular display screen, if the tablet terminal is oriented in portrait orientation, the display screen of the tablet terminal serves as a portrait-oriented display screen, and if the tablet terminal is oriented in landscape orientation, the display screen of the tablet terminal serves as a landscape-oriented display screen. Such a tablet terminal displays a ladder program horizontally so that the ladder program extends in the horizontal direction regardless of whether the tablet terminal is oriented in portrait orientation or landscape orientation. Specifically, when the tablet terminal is oriented in portrait orientation, the ladder program is written horizontally so that the ladder program extends in the lateral direction of the display screen. When the tablet terminal is oriented in landscape orientation, the ladder program is written horizontally so that the ladder program extends in the longitudinal direction of the display screen. In this manner, the tablet terminal changes the direction in which the ladder program is displayed with respect to the display screen on the basis of the result of detecting whether it is oriented in portrait orientation or landscape orientation.

CITATION LIST

Patent Literature

Patent Literature 1: Japanese Patent Application Laid-open No. 2006-285176

SUMMARY

Technical Problem

With the above conventional technology however, when the tablet terminal is oriented in landscape orientation, the number of lines that can be displayed is less than that when the tablet terminal is oriented in portrait orientation; therefore, a portion of the ladder program that cannot be displayed is generated in some cases. This means that there is a problem in that the number of lines (the amount of information) in the ladder program that can be displayed is reduced in some cases by changing the orientation of the tablet terminal to portrait orientation or landscape orientation.

The present invention has been achieved in view of the above and an object of the present invention is to obtain a ladder program display device and a ladder program display method capable of displaying a large amount of information regardless of the orientation of the display screen.

Solution to Problem

In order to solve the above problems and achieve the object, the present invention relates to a ladder program display device including: a display-direction determining unit that determines whether a ladder program is caused to be displayed in a display direction that is vertically displayed writing or horizontally displayed writing; and a display unit that displays the ladder program vertically or horizontally in accordance with an instruction from the display-direction determining unit, wherein the display-direction determining unit compares how a ladder program is displayed in a case of vertically displayed writing and how a ladder program is displayed in a case of horizontally displayed writing for each orientation of the display unit that is a portrait-oriented state or a landscape-oriented state, selects a display direction in accordance with the orientation based on a comparison result, and instructs the display unit to display a ladder program in selected display direction.

Advantageous Effects of Invention

According to the present invention, an effect is obtained where a large amount of information can be displayed regardless of the orientation of the display screen.

BRIEF DESCRIPTION OF DRAWINGS

FIG. 14-1 is a diagram illustrating rectangular circuit arrangement lattices that are shifted on each line.

FIG. 14-2 is a diagram illustrating hexagonal circuit arrangement lattices that are shifted on each line.

DESCRIPTION OF EMBODIMENTS

A ladder program display device and a ladder program display method according to embodiments of the present invention will be explained below in detail with reference to the drawings. This invention is not limited to the embodiments.

First Embodiment

Figure 1:
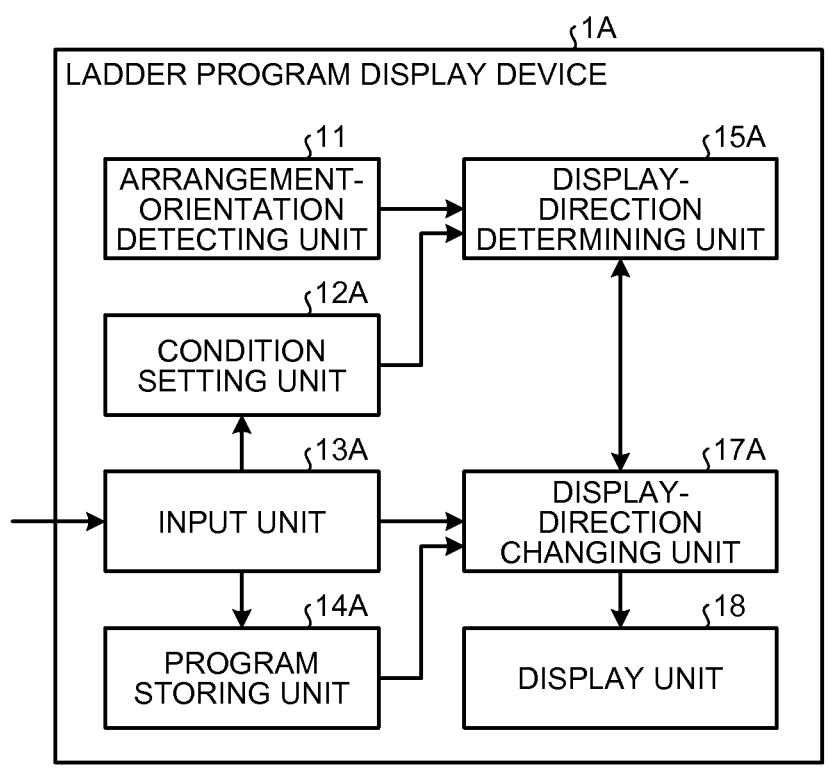
FIG. 1 is a block diagram illustrating the configuration of a ladder program display device according to a first embodiment.

FIG. 1 is a block diagram illustrating the configuration of a ladder program display device according to a first embodiment. A ladder program display device 1A is a device that displays a ladder program. A ladder program is a program that is used, for example, in a PLC (Programmable Logic Controller) and the like. The ladder program display device 1A is, for example, a tablet terminal, a liquid crystal display, a CRT (Cathode Ray Tube), a PC (Personal Computer), or a smartphone, and includes a display screen on which a ladder program is displayed.

An explanation will be given below of a case where the ladder program display device 1A is a tablet terminal. Portrait orientation of the ladder program display device 1A in the following explanation indicates the orientation with which, when the display screen has a rectangular shape, the longitudinal direction of the display screen corresponds to the vertical direction or the direction in which the user's eyes trace. Landscape orientation of the ladder program display device 1A in the following explanation indicates the orientation with which, when the display screen has a rectangular shape, the lateral direction of the display screen corresponds to the vertical direction or the direction in which the user's eyes trace.

The ladder program display device 1A in the preset embodiment displays a ladder program vertically or horizontally such that a large amount of information (ladder program) can be displayed in accordance with whether the ladder program display device 1A is oriented in portrait orientation or landscape orientation. When the ladder program display device 1A is changed from portrait orientation to landscape orientation, for example, if a portion of the ladder program that cannot be displayed is generated or the margin of the display screen becomes narrower than that when the ladder program display device 1A is oriented in portrait orientation, displaying of the ladder program is changed from horizontally displayed writing to vertically displayed writing.

The ladder program display device 1A may display a ladder program vertically or horizontally such that the legibility is improved in accordance with whether the ladder program display device 1A is oriented in portrait orientation or landscape orientation. In this case, when the ladder program display device 1A is changed from portrait orientation to landscape orientation, if it is necessary to wrap (break) one line of a ladder program and display the line in a plurality of lines, displaying of the ladder program is changed from vertically displayed writing to horizontally displayed writing.

When a ladder program is displayed vertically, for example, the ladder program is displayed in accordance with the following specifications:
The line intervals, the display specifications of contacts and coils, and the like are basically the same as those when the ladder program is displayed horizontally.
Contacts are displayed in the upper part and coils are displayed in the lower part.
Circuits (Parts) are arranged in order from the left side.
Circuits may be arranged in order from the right side.

The ladder program display device 1A includes an arrangement-orientation detecting unit 11, a condition setting unit 12A, an input unit 13A, a program storing unit 14A, a display-direction determining unit 15A, a display-direction changing unit 17A, and a display unit 18.

The arrangement-orientation detecting unit 11 detects the orientation in which the ladder program display device 1A is arranged (portrait orientation or landscape orientation). The arrangement-orientation detecting unit 11 sends the result of the detection (portrait orientation or landscape orientation) (hereinafter, referred to as arrangement information) to the display-direction determining unit 15A.

The input unit 13A receives, as an input, a condition (display changing condition) for changing the display direction of a ladder program, the ladder program itself, an instruction to cause a ladder program to be displayed (an instruction specifying a ladder program that is to be displayed), and the like. The user of the ladder program display device 1A inputs a desired display changing condition, the desired ladder program itself, a desired display instruction, and the like to the input unit 13A.

The input unit 13A sends the display changing condition to the condition setting unit 12A and sends the instruction to cause the ladder program to be displayed to the display-direction changing unit 17A. The input unit 13A sends the ladder program to the program storing unit 14A. The program storing unit 14A is, for example, a memory that stores therein the ladder program sent from the input unit 13A.

The condition setting unit 12A sets the display changing condition sent from the input unit 13A. The display changing conditions set by the condition setting unit 12A are, for example, the following (1) to (3):

(1) Displaying of a ladder program is changed to vertically displayed writing with no condition.

(2) Displaying of a ladder program is changed to horizontally displayed writing with no condition.

(3) Displaying of a ladder program is changed to vertically displayed writing or horizontally displayed writing on the basis of how the ladder program is to be displayed.

When the arrangement information sent from the arrangement-orientation detecting unit 11 is changed to portrait orientation or landscape orientation, when the ladder program display device 1A is started, or when the display changing condition set in the condition setting unit 12A is changed, the display-direction determining unit 15A determines whether to select vertically displayed writing or horizontally displayed writing. When the display-direction determining unit 15A determines which of vertically displayed writing and horizontally displayed writing is appropriate, the display-direction determining unit 15A reads the display changing condition set in the condition setting unit 12A.

The display-direction determining unit 15A determines whether the ladder program is to be displayed vertically or horizontally on the basis of the display changing condition set in the condition setting unit 12A. When the display changing condition (1) or (2) described above is set, the display-direction determining unit 15A instructs the display-direction changing unit 17A to change the display direction to the display direction in accordance with the set display changing condition.

When the display changing condition (3) described above is set, the display-direction determining unit 15A determines whether to display the ladder program vertically or horizontally on the basis of how the ladder program is to be displayed.

The display-direction determining unit 15A determines the display direction of the ladder program, for example, by using the ladder program that the display-direction changing unit 17A causes the display unit 18 to display. When the orientation of the ladder program display device 1A is changed, the display-direction determining unit 15A determines whether a portion of the ladder program that cannot be displayed is generated. In this case, the display-direction determining unit 15A compares how the ladder program is displayed in the case of vertically displayed writing and how the ladder program is displayed in the case of horizontally displayed writing by using the information on the shape and size of the display area set in the display unit 18. The display-direction determining unit 15A determines the display direction of the ladder program on the basis of the comparison result.

For example, the display-direction determining unit 15A compares the number of columns of the ladder program that can be displayed on the display screen in the case of vertically displayed writing (the number of columns in the case of vertical writing) (the number of columns in the longitudinal direction) and the number of lines of the ladder program that can be displayed on the display screen in the case of horizontally displayed writing (the number of lines in the case of horizontal writing) (the number of lines in the lateral direction). Then, the display-direction determining unit 15A selects the larger number out of the number of lines and the number of columns. In other words, when the number of lines in the case of horizontal writing is smaller than the number of columns in the case of vertical writing, the display-direction determining unit 15A selects vertical writing. When the number of columns in the case of vertical writing is smaller than the number of lines in the case of horizontal writing, the display-direction determining unit 15A selects horizontal writing. When the number of lines of the ladder program that can be displayed on the display screen in the case of horizontal writing is the same as the number of columns of the ladder program that can be displayed on the display screen in the case of vertical writing, the display-direction determining unit 15A selects horizontal writing.

The display-direction determining unit 15A may compare, for example, a margin region of the display screen in the case of vertically displayed writing (margin region in the case of vertical writing) and a margin region of the display screen in the case of horizontally displayed writing (margin region in the case of horizontal writing). In such a case, the display-direction determining unit 15A selects the larger margin region. In other words, when the margin region in the case of horizontal writing is larger than the margin region in the case of vertical writing, the display-direction determining unit 15A selects horizontally displayed writing. When the margin region in the case of vertical writing is larger than the margin region in the case of horizontal writing, the display-direction determining unit 15A selects vertically displayed writing. When the margin region in the case of horizontal writing is equal to the margin region in the case of vertical writing, the display-direction determining unit 15A selects horizontally displayed writing.

The display-direction determining unit 15A may compare, for example, the number of times the ladder program to be displayed on the display screen is wrapped in the case of horizontally displayed writing (the number of wrappings in the case of horizontal writing) and the number of times the ladder program to be displayed on the display unit 18 is wrapped in the case of vertical writing (the number of wrappings in the case of vertical writing). In such a case, the display-direction determining unit 15A selects the smaller number of wrappings. In other words, when the number of wrappings in the case of vertical writing is larger than the number of wrappings in the case of horizontal writing, the display-direction determining unit 15A selects horizontally displayed writing. When the number of wrappings in the case of horizontal writing is larger than the number of wrappings in the case of vertical writing, the display-direction determining unit 15A selects vertically displayed displaying. When the number of wrappings in the case of horizontal writing is equal to the number of wrappings in the case of vertical writing, the display-direction determining unit 15A selects horizontally displayed writing.

For example, when the orientation is changed from portrait orientation (horizontally displayed writing) to landscape orientation (vertically displayed writing) or from landscape orientation (vertically displayed writing) to portrait orientation (horizontally displayed writing), the display-direction determining unit 15A determines whether to change the display direction.

For example, when the orientation is changed from portrait orientation (horizontally displayed writing) to landscape orientation (vertically displayed writing), the display-direction determining unit 15A determines whether a portion of the ladder program that cannot be displayed on the display screen is newly generated if the ladder program keeps being displayed horizontally. If the number of lines in the case of horizontal writing is smaller than the number of lines in the case of vertical writing, the display-direction determining unit 15A determines that a portion of the ladder program that cannot be displayed is newly generated and selects vertically displayed writing.

For example, when the orientation is changed from portrait orientation (horizontally displayed writing) to landscape orientation (vertically displayed writing), the display-direction determining unit 15A determines whether the margin region of the display screen in the case of vertical writing becomes larger than that in the case of horizontal writing if the ladder program keeps being displayed horizontally. If the margin region in the case of vertical writing becomes larger than that in the case of horizontal writing, the display-direction determining unit 15A selects vertically displayed writing.

For example, when the orientation is changed from portrait orientation (vertically displayed writing) to landscape orientation (horizontally displayed writing), the display-direction determining unit 15A determines whether wrapping of the ladder program newly occurs if the ladder program keeps being displayed vertically. If the number of wrappings in the case of vertical writing becomes larger than the number of wrappings in the case of horizontal writing, the display-direction determining unit 15A determines that wrapping of the ladder program newly occurs and selects horizontally displayed writing.

When the display-direction determining unit 15A determines that the ladder program is to be displayed vertically, the display-direction determining unit 15A sends an instruction to display the ladder program vertically to the display-direction changing unit 17A. When the display-direction determining unit 15A determines that the ladder program is to be displayed horizontally, the display-direction determining unit 15A sends an instruction to display the ladder program horizontally to the display-direction changing unit 17A.

For example, when both (A) and (B) described below are satisfied, the display-direction determining unit 15A displays the ladder program vertically. When either (A) or (B) described below is satisfied, the display-direction determining unit 15A may display the ladder program vertically:

(A) A portion of a ladder program that cannot be displayed on the display screen is newly generated.

(B) The margin of the display screen in the case of vertical writing becomes larger than that in the case of horizontal writing.

For example, when the ladder program display device 1A is started, if the ladder program display device 1A is in a portrait-oriented state, the display-direction determining unit 15A may determine that the ladder program is to be written horizontally and, if the ladder program display device 1A is in a landscape-oriented state, the display-direction determining unit 15A may determine that the ladder program is to be written vertically.

In such a case, when the ladder program display device 1A is in a portrait-oriented state and the display changing condition (1) described above is set, the display-direction determining unit 15A may change the ladder program from horizontal writing to vertical writing. When the ladder program display device 1A is in a landscape-oriented state and the display changing condition (2) described above is set, the display-direction determining unit 15A may change the ladder program from vertical writing to horizontal writing. When the display changing condition (3) described above is set, the display-direction determining unit 15A may change the displaying of the ladder program to vertically displayed writing or horizontally displayed writing on the basis of how the ladder program is to be displayed.

The display-direction determining unit 15A may determine the display direction of the ladder program on the basis of the ladder program that is actually displayed on the display screen. In such a case, the display-direction determining unit 15A obtains the information on how the ladder program is to be displayed from the display unit 18.

The display-direction changing unit 17A causes the display unit 18 to display the ladder program on the basis of the instruction sent from the display-direction determining unit 15A. When the display-direction changing unit 17A receives an instruction to display the ladder program vertically, the display-direction changing unit 17A causes the display unit 18 to display the ladder program vertically. When the display-direction changing unit 17A receives an instruction to display the ladder program horizontally, the display-direction changing unit 17A causes the display unit 18 to display the ladder program horizontally. The display unit 18 is a display screen that displays the ladder program vertically or horizontally.

The components of the ladder program display device 1A may be arranged separately in different devices. For example, the display unit 18 and the arrangement-orientation detecting unit 11 may be arranged in the display device connected to the computer and the program storing unit 14A may be arranged in the computer. In this case, the arrangement-orientation detecting unit 11 detects the orientation in which the display unit 18 is arranged.

Figure 2:
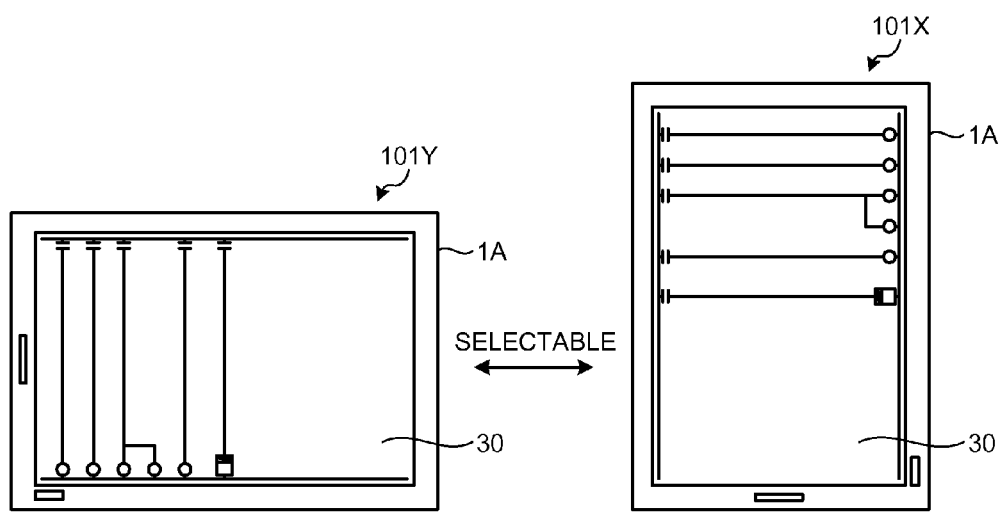
FIG. 2 is a diagram for explaining vertically displayed writing and horizontally displayed writing for a ladder program.

An explanation will be given here of vertically displayed writing and horizontally displayed writing for a ladder program. FIG. 2 is a diagram for explaining vertically displayed writing and horizontally displayed writing for a ladder program. The ladder program display device 1A is oriented in landscape orientation so as to be in a landscape-oriented state 101Y. In the landscape-oriented state 101Y, a display screen 30 is landscape-oriented. The ladder program is displayed vertically on the display screen 30.

The ladder program display device 1A is oriented in portrait orientation so as to be in a portrait-oriented state 101X. In the portrait-oriented state 101X, the display screen 30 is portrait-oriented. The ladder program is displayed horizontally on the display screen 30.

As described above, it is possible to select either horizontally displayed writing or vertically displayed writing for the ladder program. The ladder program display device 1A in the present embodiment is used in the landscape-oriented state 101Y or the portrait-oriented state 101X. The user can switch between the landscape-oriented state 101Y and the portrait-oriented state 101X.

The ladder program display device 1A may be switched between the landscape-oriented state 101Y and the portrait-oriented state 101X by causing the user to select from a menu (items for specifying the orientation) of an application included in the ladder program display device 1A.

Even when the ladder program display device 1A is in the landscape-oriented state 101Y, the ladder program may be written horizontally. Even when the ladder program display device 1A is in the portrait-oriented state 101X, the ladder program may be written vertically.

Figure 3:
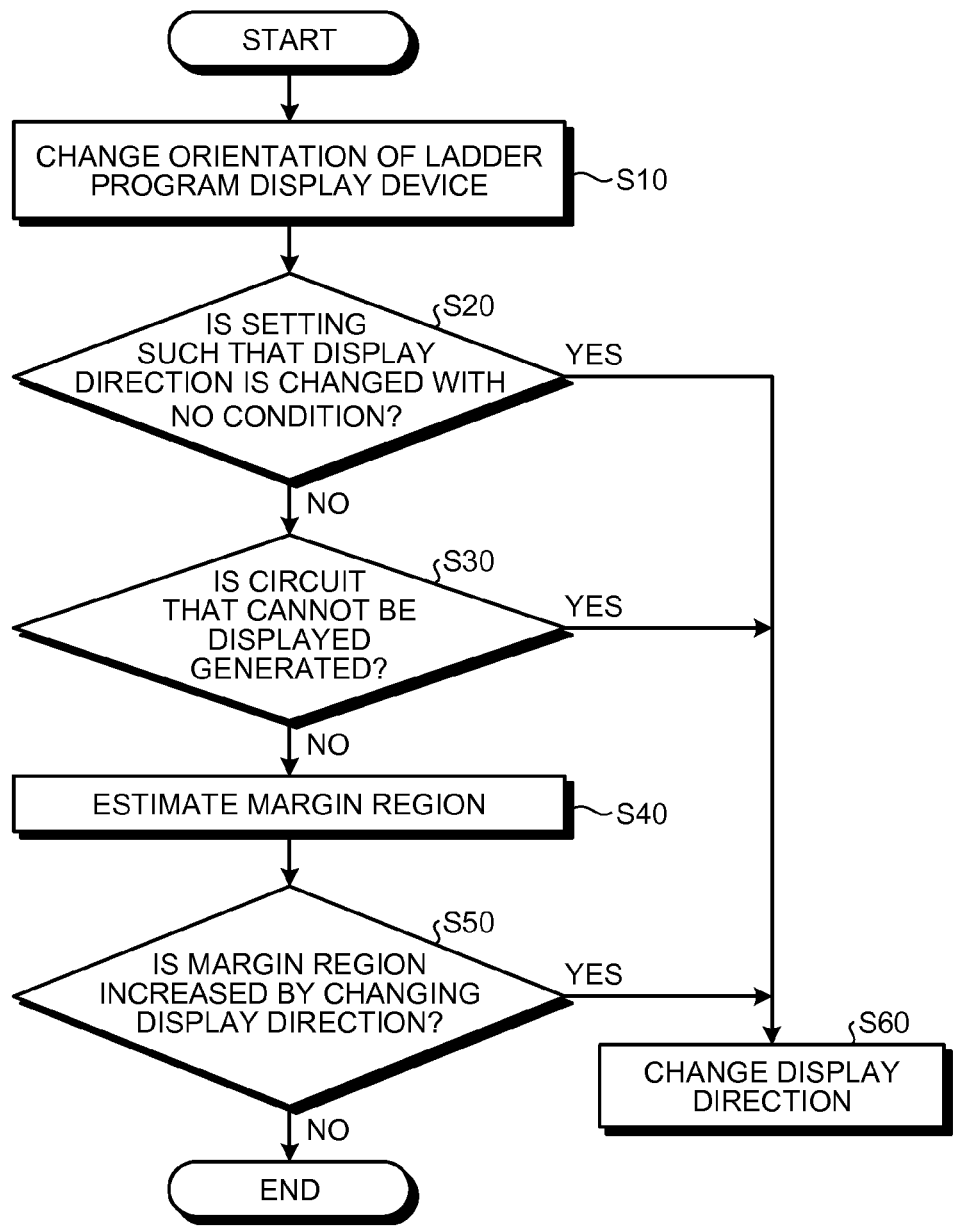
FIG. 3 is a flowchart illustrating the procedure of the process of changing the display direction performed by the ladder program display device in the first embodiment.

The procedure of the display changing process performed on the ladder program will be explained next. FIG. 3 is a flowchart illustrating the procedure of the process of changing the display direction performed by the ladder program display device in the first embodiment. When the orientation of the ladder program display device 1A is changed by the user (Step S10), the arrangement-orientation detecting unit 11 sends the arrangement information indicating the orientation in which the ladder program display device 1A is arranged to the display-direction determining unit 15A.

Accordingly, the display-direction determining unit 15A determines whether the setting is such that the display direction of the ladder program is changed with no condition (Step S20). Specifically, the display-direction determining unit 15A reads the display changing condition set in the condition setting unit 12A. Then, the display-direction determining unit 15A determines whether the display changing condition is any one of (1) changing the displaying of the ladder program to vertically displayed writing with no condition and (2) changing the displaying of the ladder program to horizontally displayed writing with no condition.

When the setting is such that the display direction of the ladder program is changed with no condition (Yes at Step S20), the display-direction determining unit 15A changes the display direction of the ladder program to the display direction in accordance with the display changing condition (Step S60).

For example, when the display changing condition is (1) described above, the display-direction determining unit 15A sends an instruction to display the ladder program vertically to the display-direction changing unit 17A. In this case, the display-direction determining unit 15A causes the display unit 18 to display the ladder program vertically.

When the display changing condition is (2) described above, the display-direction determining unit 15A sends an instruction to display the ladder program horizontally to the display-direction changing unit 17A. In this case, the display-direction determining unit 15A causes the display unit 18 to display the ladder program horizontally.

When the display changing condition is (3) described above, the display-direction determining unit 15A determines that the setting is not such that the display direction of the ladder program is changed with no condition. When the setting is not such that the display direction of the ladder program is changed with no condition (No at Step S20), the display-direction determining unit 15A determines whether changing of the orientation of the ladder program display device 1A newly generates a circuit (ladder program) that cannot be displayed on the display screen as a result of maintaining the display direction of the ladder program (Step S30).

When a circuit that cannot be displayed on the display screen is newly generated (Yes at Step S30), the display-direction determining unit 15A causes the display direction of the ladder program to be changed in accordance with the orientation of the ladder program display device 1A (Step S60). For example, when a circuit that cannot be displayed on the display screen is newly generated due to the ladder program display device 1A being changed from portrait orientation (horizontal writing) to landscape orientation (horizontal writing), the display-direction determining unit 15A determines that the ladder program is to be displayed vertically.

When a circuit that cannot be displayed on the display screen is not generated (No at Step S30), the display-direction determining unit 15A estimates the size of the margin region in the case of vertical writing and the size of the margin region in the case of horizontal writing (Step S40) and compares these sizes.

The display-direction determining unit 15A determines whether changing of the orientation of the ladder program display device 1A increases the margin region to be displayed on the display screen as a result of changing the display direction of the ladder program (Step S30). In other words, the display-direction determining unit 15A determines whether the margin region that can be displayed on the display screen is increased by changing the current display direction (Step S50).

When the margin region that can be displayed on the display screen is increased by changing the current display direction in accordance with the orientation of the ladder program display device 1A (Yes at Step S50), the display-direction determining unit 15A causes the display direction of the ladder program to be changed (Step S60). For example, when the margin region that can be displayed on the display screen is reduced by changing the orientation of the ladder program display device 1A from portrait orientation (horizontally displayed writing) to landscape orientation (horizontally displayed writing), the display-direction determining unit 15A determines that the ladder program is to be displayed vertically.

In contrast, when the margin region that can be displayed on the display screen is not increased even if the current display direction is changed in accordance with the orientation of the ladder program display device 1A (No at Step S50), the display-direction determining unit 15A does not cause the display direction of the ladder program to be changed. For example, when the margin region that can be displayed on the display screen is not increased even if the ladder program display device 1A is changed from portrait orientation (vertically displayed writing) to landscape orientation (horizontally displayed writing), the display-direction determining unit 15A determines that the ladder program is to be displayed horizontally.

Figure 4:
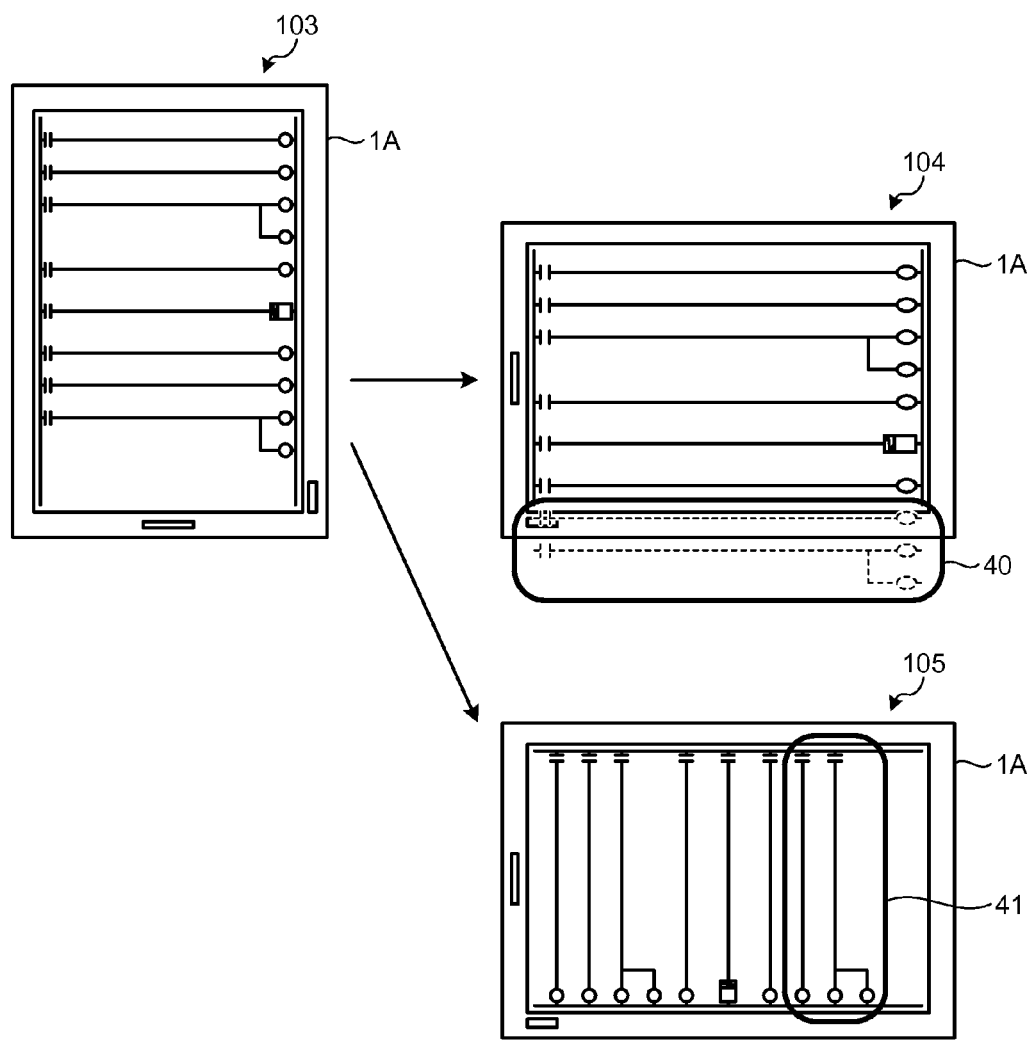
FIG. 4 is a diagram for explaining circuits that can be displayed in the case of vertical writing and horizontal writing.

FIG. 4 is a diagram for explaining circuits that can be displayed in the case of vertical writing and horizontal writing. FIG. 4 illustrates an example of circuits that are displayed on the display screen when the ladder program display device 1A is changed from a portrait-oriented state 103 to a landscape-oriented state 104 or 105.

The display screen in the landscape-oriented state 104 displays circuits in the case where the ladder program is displayed horizontally. The display screen in the landscape-oriented state 105 displays circuits in the case where the ladder program is displayed vertically.

When the ladder program display device 1A is changed from the portrait-oriented state 103 to the landscape-oriented state 104, the vertical width (height) of the display screen becomes the shortest side; therefore, the number of lines of the ladder program that can be displayed on the display screen is reduced. Accordingly, a program area 40 may be generated that is displayed on the display screen in the portrait-oriented state 103 but is not displayed on the display screen due to the ladder program display device 1A being changed to the landscape-oriented state 104. In this case, the display-direction determining unit 15A determines that a circuit that cannot be displayed on the display screen is newly generated.

Meanwhile, when the ladder program display device 1A is changed from the portrait-oriented state 103 to the landscape-oriented state 105, the horizontal width of the display screen in the landscape-oriented state 105 is the same as the vertical width of the display screen in the portrait-oriented state 103. Therefore, in the landscape-oriented state 105, it is possible to display the same program area as that displayed in the portrait-oriented state 103 by writing the ladder program vertically. FIG. 4 illustrates, as a program area 41, a program area that is not displayed on the display screen in the landscape-oriented state 104 but is displayed on the display screen in the landscape-oriented state 105.

Figure 5:
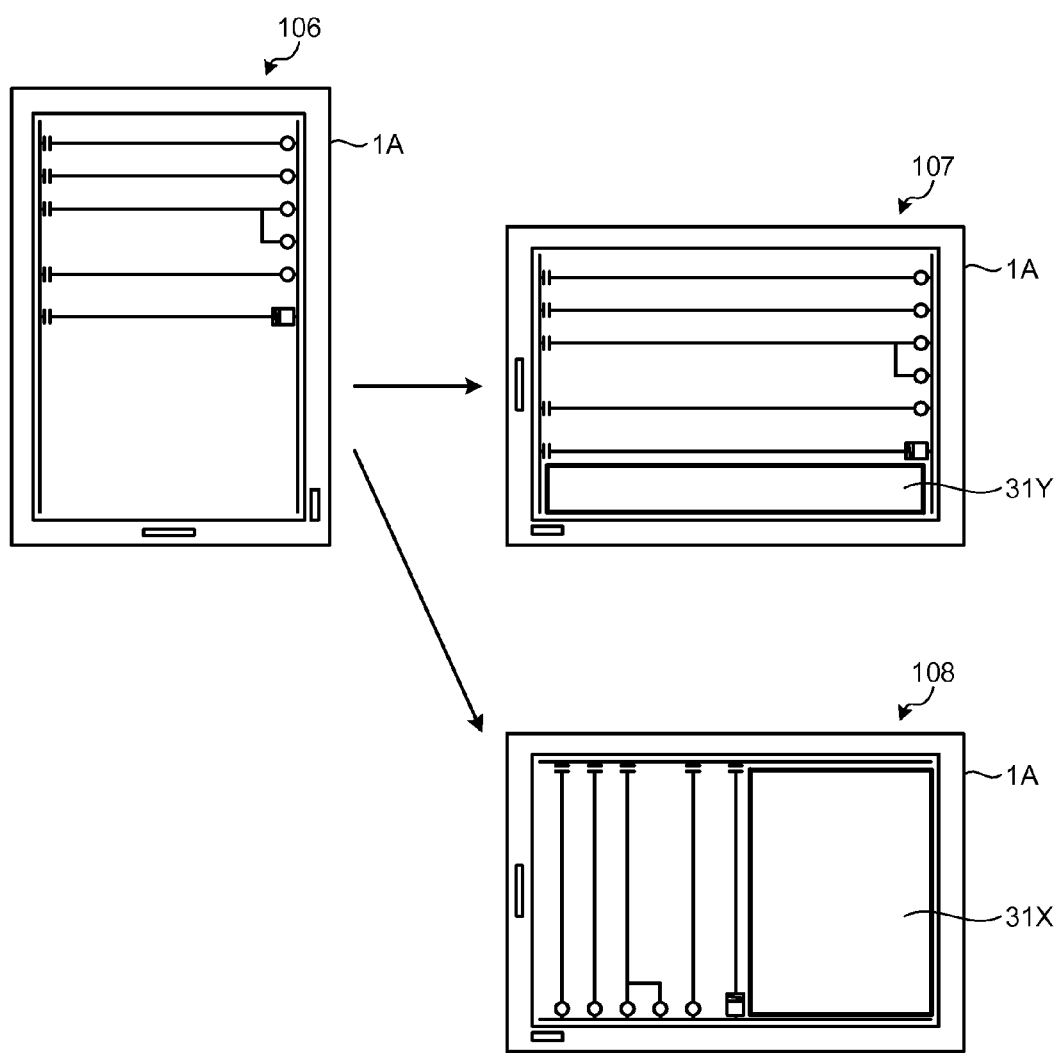
FIG. 5 is a diagram for explaining margin regions to be displayed in the case of vertical writing and horizontal writing.

FIG. 5 is a diagram for explaining margin regions to be displayed in the case of vertical writing and horizontal writing. FIG. 5 illustrates an example of a margin region that is displayed on the display screen when the ladder program display device 1A is changed from a portrait-oriented state 106 to a landscape-oriented state 107 or 108.

The display screen in the landscape-oriented state 107 displays a margin region in the case where the ladder program is displayed horizontally and the display screen in the landscape-oriented state 108 displays a margin region in the case where the ladder program is displayed vertically.

When the ladder program display device 1A is changed from the portrait-oriented state 106 to the landscape-oriented state 107, the vertical width of the display screen becomes the shortest side; therefore, the number of lines of the ladder program that can be displayed on the display screen is reduced. Meanwhile, when the ladder program display device 1A is changed from the portrait-oriented state 106 to the landscape-oriented state 108, the horizontal width of the display screen in the landscape-oriented state 108 is the same as the vertical width of the display screen in the portrait-oriented state 106.

Accordingly, a margin region 31Y that is displayed in the landscape-oriented state 107 becomes narrower than a margin region 31X that is displayed in the landscape-oriented state 108. The display-direction determining unit 15A determines that the margin region that can be displayed on the display screen is larger in the landscape-oriented state 108 (vertically displayed writing) than in the landscape-oriented state 107 (horizontally displayed writing). In other words, the display-direction determining unit 15A determines that the margin region that can be displayed on the display screen is reduced when the ladder program display device 1A is changed from the portrait-oriented state 106 to the landscape-oriented state 107.

When the ladder program display device 1A is changed from a portrait-oriented state (vertically displayed writing) to a landscape-oriented state (vertically displayed writing), if wrapping of the ladder program newly occurs equal to or more than a predetermined number of times, the ladder program display device 1A may display the ladder program horizontally.

In a similar manner, when the ladder program display device 1A is changed from a landscape-oriented state (horizontally displayed writing) to a portrait-oriented state (horizontally displayed writing), if wrapping of the ladder program newly occurs equal to or more than a predetermined number of times, the ladder program display device 1A may display the ladder program vertically.

It is possible to set, in the condition setting unit 12A, the priority order indicating whether priority is given to displaying a large amount of information (ladder program) or reducing wrapping (improving the legibility). At least one of conditions (a) to (i) as described below may be set in the condition setting unit 12A:

(a) Displaying a large amount of information is prioritized with no condition. If the amount of information that can be displayed is the same, wrapping is reduced.

(b) When the difference in the number of displayed lines is equal to or more than a predetermined number between vertically displayed writing and horizontally displayed writing, displaying a large amount of information is prioritized.

(c) When the difference in the number of displayed lines is less than the predetermined number, reducing wrapping is prioritized.

(d) When the difference in area of a margin region is equal to or more than a predetermined area between vertically displayed writing and horizontally displayed writing, displaying a large amount of information is prioritized.

(e) When the difference in area of a margin region is less than the predetermined area, reducing wrapping is prioritized.

(f) Reducing wrapping is prioritized with no condition. If the number of wrappings is the same, a large amount of information is caused to be displayed.

(g) When the difference in the number of wrappings of a ladder program is equal to or more than a predetermined number between vertically displayed writing and horizontally displayed writing, reducing wrapping is prioritized.

(h) When the difference in the number of wrappings of a ladder program is less than the predetermined number, displaying a large amount of information is prioritized.

(i) Coefficient (weighting) indicating priority is applied to each of the number of displayed lines, the margin region, and the number of wrappings, and either vertically displayed writing or horizontally displayed writing is selected on the basis of the sum of the priorities.

The above-described conditions (a) to (i) may be combined.

As described above, according to the first embodiment, the display direction that can display a large amount of information (ladder program) is selected from vertically displayed writing and horizontally displayed writing to display the ladder program; therefore, a large amount of information can be displayed regardless of the orientation of the display screen. Moreover, even when the orientation of the display screen (the ladder program display device 1A) is changed to portrait orientation or landscape orientation, it is possible to maintain the amount of information that can be displayed.

Moreover, the display direction in which a ladder program can be displayed with a lower number of wrappings is selected from vertically displayed writing and horizontally displayed writing to display the ladder program; therefore, the legibility of the ladder program is improved and the operability (ease of editing) of the ladder program is improved regardless of the orientation of the display screen.

Second Embodiment

Figure 7:
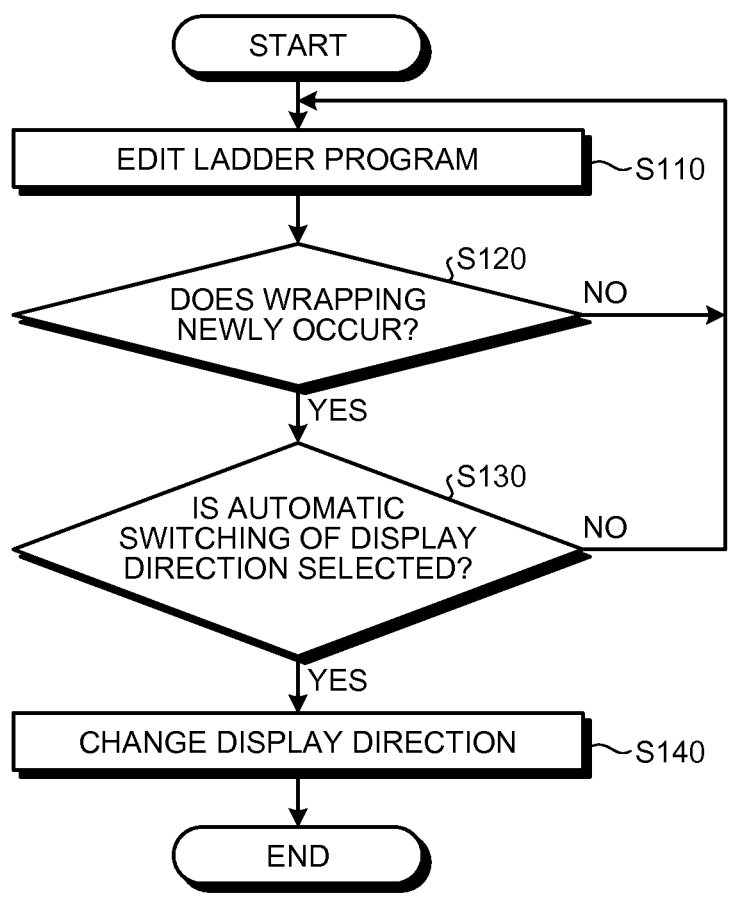
FIG. 7 is a flowchart illustrating the procedure of the process of changing the display direction performed by the ladder program display device in the second embodiment.
Figure 8:
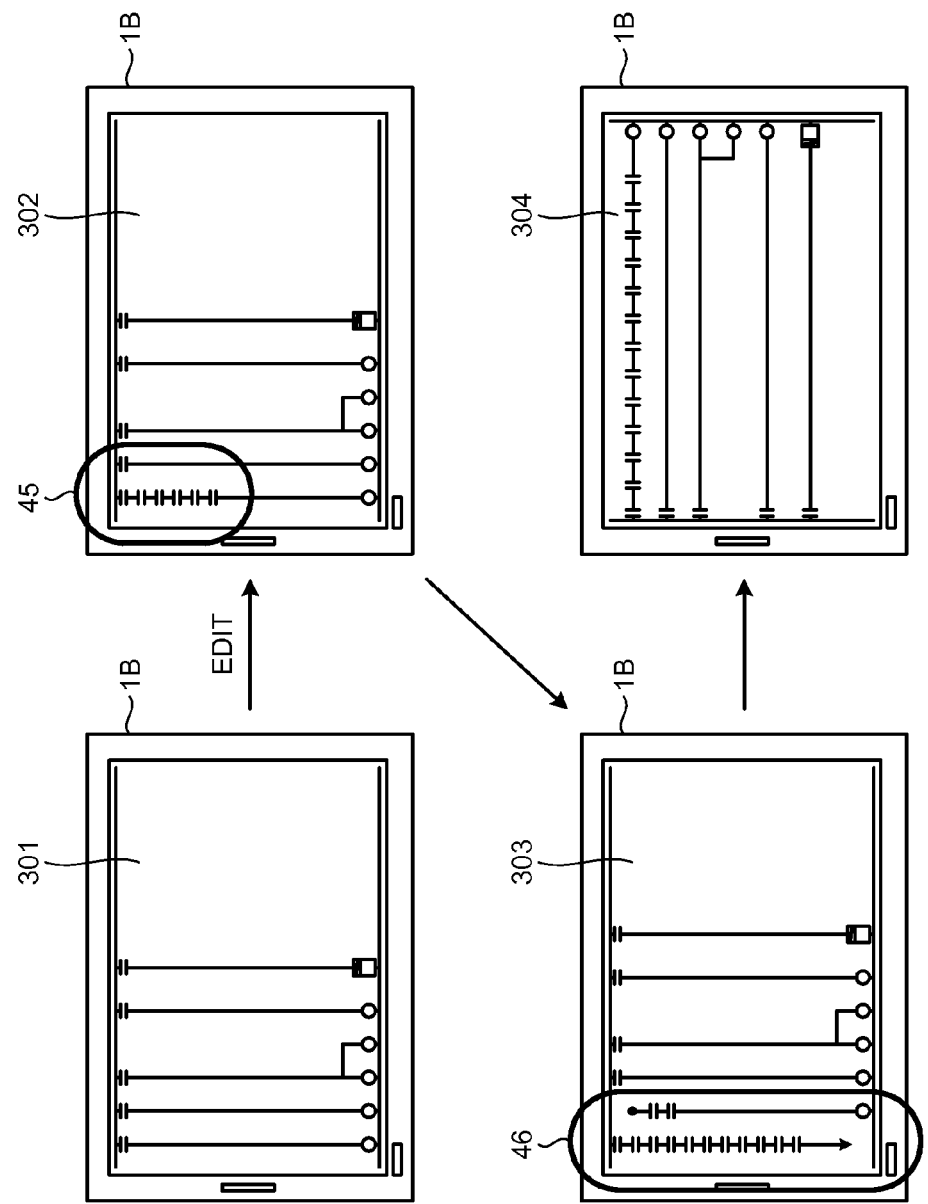
FIG. 8 is a diagram for explaining wrapping of a ladder program.

Next, a second embodiment of the present invention will be explained with reference to FIG. 6 to FIG. 8. In the second embodiment, a ladder program display device that can edit a ladder program is explained.

Figure 6:
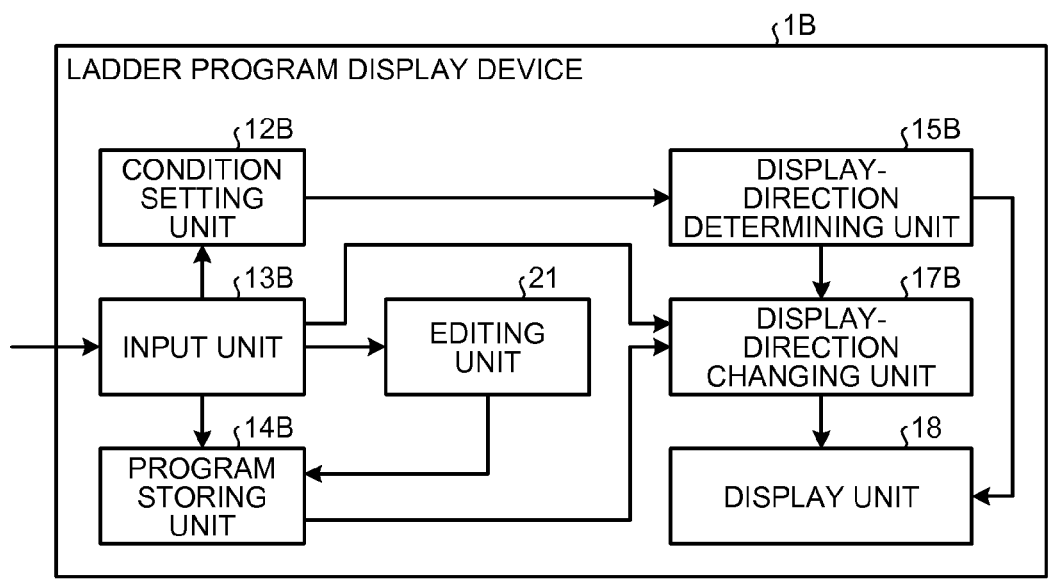
FIG. 6 is a block diagram illustrating the configuration of a ladder program display device according to a second embodiment.

FIG. 6 is a block diagram illustrating the configuration of a ladder program display device according to the second embodiment. Among the components illustrated in FIG. 6, the components that achieve the same functions as those of the ladder program display device 1A according to the first embodiment illustrated in FIG. 1 are designated by like reference numerals and redundant explanations thereof are omitted.

When a ladder program is edited, if wrapping of the ladder program newly occurs, a ladder program display device 1B in the present embodiment changes the display direction of the ladder program so that the wrapping is eliminated.

The ladder program display device 1B includes a condition setting unit 12B, an input unit 13B, a program storing unit 14B, a display-direction determining unit 15B, a display-direction changing unit 17B, the display unit 18, and an editing unit 21.

The input unit 13B receives, as an input, a condition (display changing condition) for changing the display direction of a ladder program, the ladder program itself, an instruction to cause a ladder program to be displayed, an instruction (edit content) to edit a ladder program, and the like.

The input unit 13B sends the display changing condition to the condition setting unit 12B and sends the instruction to cause the ladder program to be displayed to the display-direction changing unit 17B. The input unit 13B sends the ladder program to the program storing unit 14B. The input unit 13B sends the instruction to edit the ladder program to the editing unit 21.

The editing unit 21 edits the ladder program in accordance with the instruction to edit the ladder program. The program storing unit 14B is, for example, a memory that stores therein the ladder program sent from the input unit 13B and the ladder program edited by the editing unit 21.

The condition setting unit 12B sets the display changing condition sent from the input unit 13B. The display changing conditions set by the condition setting unit 12B are, for example, the following (4) and (5):

(4) Displaying direction of a ladder program is not changed regardless of wrapping of the ladder program.

(5) Displaying of a ladder program is changed to vertically displayed writing or horizontally displayed writing on the basis of the number of wrappings of the ladder program.

In the following explanation, the case where the display changing condition (4) described above is set is referred to as a case with no automatic change setting and the case where the display changing condition (5) described above is set is referred to as a case with automatic change setting.

When the ladder program display device 1B is configured such that it is used in a portrait-oriented state, the ladder program display device 1B sets horizontally displayed writing as the default setting. Meanwhile, when the ladder program display device 1B is configured such that it is used in a landscape-oriented state, the ladder program display device 1B sets vertically displayed writing as the default setting. In a similar manner to the display-direction determining unit 15A, the display-direction determining unit 15B may determine the display direction of the ladder program on the basis of the amount of information that can be displayed on the display screen or the legibility of the ladder program.

The display-direction determining unit 15B determines the display direction (vertical writing or horizontal writing) of the ladder program on the basis of how the ladder program is displayed on the display unit 18. In the case with automatic change setting, when wrapping of the ladder program newly occurs as a result of editing the ladder program, the display-direction determining unit 15B changes the display direction of the ladder program so that the wrapping that newly occurs is eliminated. For example, when the ladder program display device 1B is oriented in portrait orientation, the ladder program is displayed horizontally. In this case, when wrapping of the ladder program newly occurs as a result of editing the ladder program, the display-direction determining unit 15B changes the ladder program such that it is displayed vertically.

When the wrapping of the ladder program is eliminated as a result of further editing the ladder program, the display-direction determining unit 15B may restore the ladder program such that it is displayed horizontally.

When the display-direction determining unit 15B determines that the ladder program is to be displayed vertically, the display-direction determining unit 15B sends an instruction to display the ladder program vertically to the display-direction changing unit 17B. When the display-direction determining unit 15B determines that the ladder program is to be displayed horizontally, the display-direction determining unit 15B sends an instruction to display the ladder program horizontally to the display-direction changing unit 17B.

The display-direction changing unit 17B causes the display unit 18 to display the ladder program on the basis of the information sent from the display-direction determining unit 15B. When the display changing condition (4) is sent, the display-direction changing unit 17B determines the default setting set in the ladder program display device 1B as the display direction of the ladder program regardless of wrapping of the ladder program.

When an instruction to display the ladder program vertically is sent, the display-direction changing unit 17B causes the display unit 18 to display the ladder program vertically. When an instruction to display the ladder program horizontally is sent, the display-direction changing unit 17B causes the display unit 18 to display the ladder program horizontally. The components of the ladder program display device 1B may be arranged separately in different devices.

The procedure of the display changing process performed on the ladder program will be explained next. FIG. 7 is a flowchart illustrating the procedure of the process of changing the display direction performed by the ladder program display device in the second embodiment. When the ladder program in the ladder program display device 1B is edited by the user (Step S110), the display-direction determining unit 15B determines whether wrapping newly occurs in the edited ladder program (Step S120).

When wrapping does not newly occur in the edited ladder program (No at Step S120), the display-direction determining unit 15B maintains the current display direction of the ladder program. Then, the editing operation of the ladder program is continued (Step S110).

In contrast, when wrapping newly occurs in the edited ladder program (Yes at Step S120), the display-direction determining unit 15B determines whether the display changing condition is set to the case with automatic change setting. In other words, the display-direction determining unit 15B determines whether automatic switching of the display direction is selected (Step S130). Specifically, the display-direction determining unit 15B reads the display changing condition set in the condition setting unit 12B. Then, the display-direction determining unit 15B determines whether the display changing condition is the display changing condition (5) described above.

When the display changing condition (4) described above is set (the case with no automatic change setting) (No at Step S130), the display-direction determining unit 15B maintains the current display direction of the ladder program. Then, the editing operation of the ladder program is continued (Step S110).

Meanwhile, when the display changing condition (5) described above is set (the case with automatic change setting) (Yes at Step S130), the display-direction determining unit 15B changes the display direction of the ladder program so that the wrapping that newly occurs is eliminated (Step S140).

Wrapping of a ladder program will be explained here. FIG. 8 is a diagram for explaining wrapping of a ladder program. FIG. 8 illustrates an example of circuits displayed on display screens 301 to 304 when the ladder program display device 1B is in a landscape-oriented state.

When the ladder program display device 1B is in a landscape-oriented state, the ladder program is displayed vertically. In FIG. 8, the display screen before the ladder program is edited is illustrated as the display screen 301. In this case, when the ladder program is edited, the display screen becomes the display screen 302. In FIG. 8, the edited program area is illustrated as a program area 45. Even when the ladder program is edited, if wrapping of the ladder program does not newly occur, the display-direction determining unit 15B does not change the display direction of the ladder program. In this example, the display-direction determining unit 15B keeps displaying the ladder program vertically.

Thereafter, when the ladder program is further edited, the display screen becomes the display screen 303. Wrapping of the ladder program newly occurs in some cases as a result of editing the ladder program. In FIG. 8, the program area in which wrapping occurs is illustrated as a program area 46.

When wrapping occurs in the ladder program, the display-direction determining unit 15B changes the display direction of the ladder program so that the wrapping of the ladder program is eliminated. In this example, the display-direction determining unit 15B changes the ladder program such that it is displayed horizontally. Consequently, the display screen is changed from the display screen 303, on which the ladder program is displayed vertically, to the display screen 304, on which the ladder program is displayed horizontally.

The functions of the ladder program display device 1A may be added to the ladder program display device 1B. For example, the ladder program display device 1B may be configured to include the arrangement-orientation detecting unit 11.

When there is wrapping even before the ladder program is edited, the display-direction determining unit 15B may change the display direction of the ladder program so that the wrapping of the ladder program is eliminated before the ladder program is edited.

Figure 9:
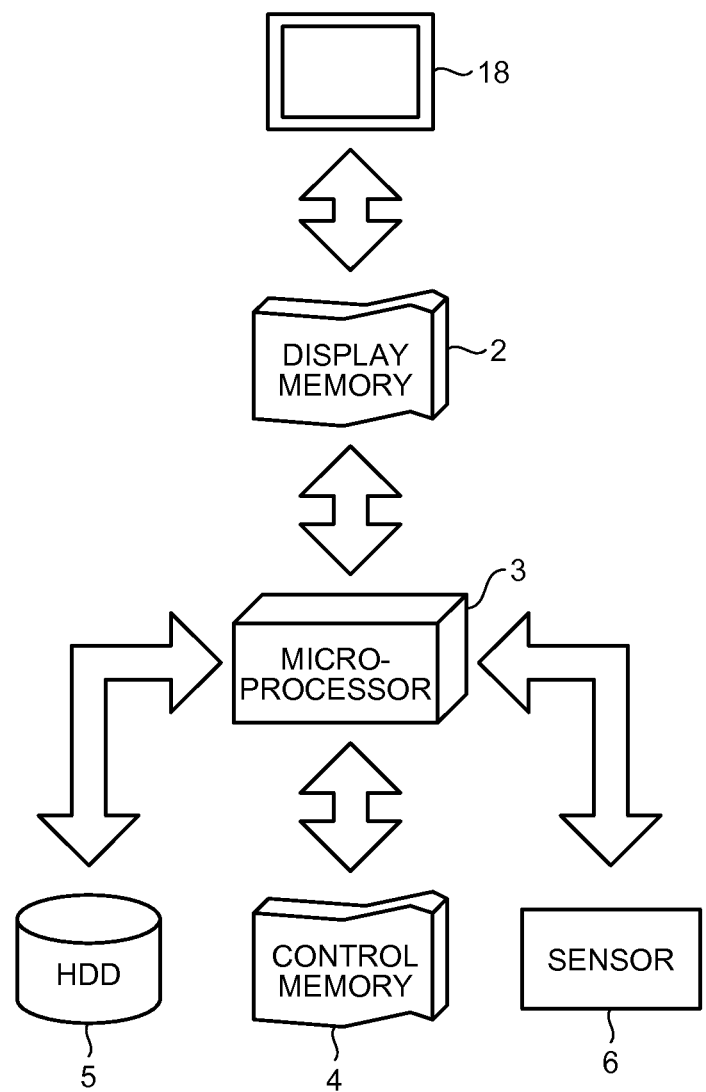
FIG. 9 is a diagram illustrating the hardware configuration of the ladder program display device.

FIG. 9 is a diagram illustrating the hardware configuration of the ladder program display device. Because the ladder program display devices 1A and 1B have similar hardware configurations, the hardware configuration of the ladder program display device 1A is explained here.

The ladder program display device 1A includes the display unit 18, a display memory 2, a microprocessor 3, a control memory 4, an HDD (Hard Disk Drive) 5, and a sensor 6. In the ladder program display device 1A, the display unit 18, the display memory 2, the microprocessor 3, the control memory 4, the HDD 5, and the sensor 6 are connected via a bus line.

The sensor 6 detects orientation (portrait orientation or landscape orientation) in which the ladder program display device 1A is arranged. The sensor 6 in this example corresponds to the arrangement-orientation detecting unit 11. The HDD 5 stores a computer program (display-direction determining program) used when the display direction of a ladder program is determined, the display changing conditions, and the like. In such a manner, the HDD 5 is configured to include the program storing unit 14A and the condition setting unit 12A.

The microprocessor 3 determines the display direction of a ladder program on the basis of the arrangement information (portrait orientation or landscape orientation) sent from the sensor 6. In this case, the microprocessor 3 determines the display direction of the ladder program by using the display-direction determining program. Moreover, the microprocessor 3 stores, in the control memory 4, information necessary when the display direction of the ladder program is determined. The control memory 4 is, for example, a RAM (Random Access Memory).

The display unit 18 is a display device, such as a liquid crystal monitor, and displays a ladder program on the basis of an instruction from the microprocessor 3. In order to display a ladder program on the display unit 18, the ladder program is stored in advance in the display memory 2 and the display unit 18 is caused to display the ladder program stored in the display memory 2. The display memory 2 is, for example, a RAM.

The ladder program display device 1A includes the input unit 13A (not illustrated here), such as a mouse and a keyboard, and receives, as an input, instruction information (such as a display changing condition) that is externally input by the user. The instruction information input to the input unit 13A is sent to the microprocessor 3.

The display-direction determining program is loaded in the control memory 4 from the HDD 5 via the bus line. The microprocessor 3 executes the display-direction determining program loaded in the control memory 4. Specifically, in the ladder program display device 1A, the microprocessor 3 reads the display-direction determining program from the HDD 5, loads the display-direction determining program in a program storage region in the control memory 4, and executes various processes. The microprocessor 3 temporarily stores various data generated in the various processes in a data storage region formed in the control memory 4. The display-direction determining program may be stored in a ROM (Read Only Memory) (not illustrated).

The display-direction determining program executed in the ladder program display device 1A is configured from modules including the display-direction determining unit 15A and the display-direction changing unit 17A, and they are loaded in the main memory to be generated in the main memory.

As described above, according to the second embodiment, even when wrapping newly occurs as a result of editing the ladder program, the display direction of the ladder program is changed so that the wrapping is eliminated; therefore, the legibility of the ladder program is improved and the operability (ease of editing) of the ladder program is improved.

Third Embodiment

Next, a third embodiment of the present invention will be explained with reference to FIG. 10 to FIG. 15. In the third embodiment, a large amount of information is displayed on the display screen without reducing the legibility by changing the arrangement positions and the like of circuits in a ladder program. In the following explanation, a case where a ladder program displaying device 1C arranges circuits is explained; however, the ladder program display device 1A or 1B may arrange circuits.

Figure 10:
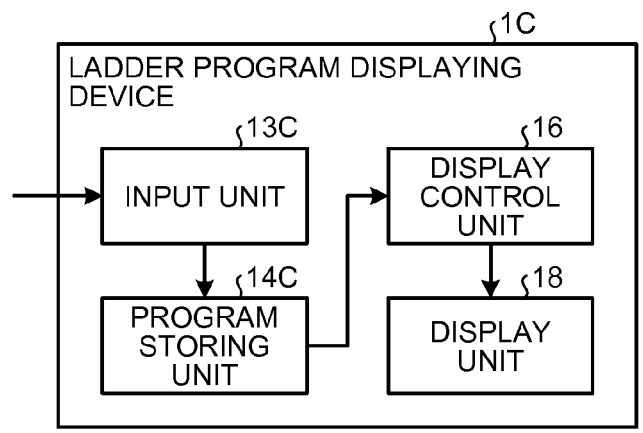
FIG. 10 is a block diagram illustrating the configuration of a ladder program display device according to a third embodiment.

FIG. 10 is a block diagram illustrating the configuration of a ladder program display device according to the third embodiment. Among the components illustrated in FIG. 10, the components that achieve the same functions as those of the ladder program display device 1A according to the first embodiment illustrated in FIG. 1 are designated by like reference numerals and redundant explanations thereof are omitted.

The ladder program displaying device 1C includes an input unit 13C, a program storing unit 14C, a display control unit 16, and the display unit 18. The input unit 13C receives, as an input, the ladder program itself, an instruction to cause a ladder program to be displayed, and the like. The input unit 13C sends the instruction to cause the ladder program to be displayed to the display control unit 16 and sends the ladder program to the program storing unit 14C. The display control unit 16 causes the display unit 18 to display the circuits in the ladder program such that a large amount of information is displayed on the display screen.

Figure 11:
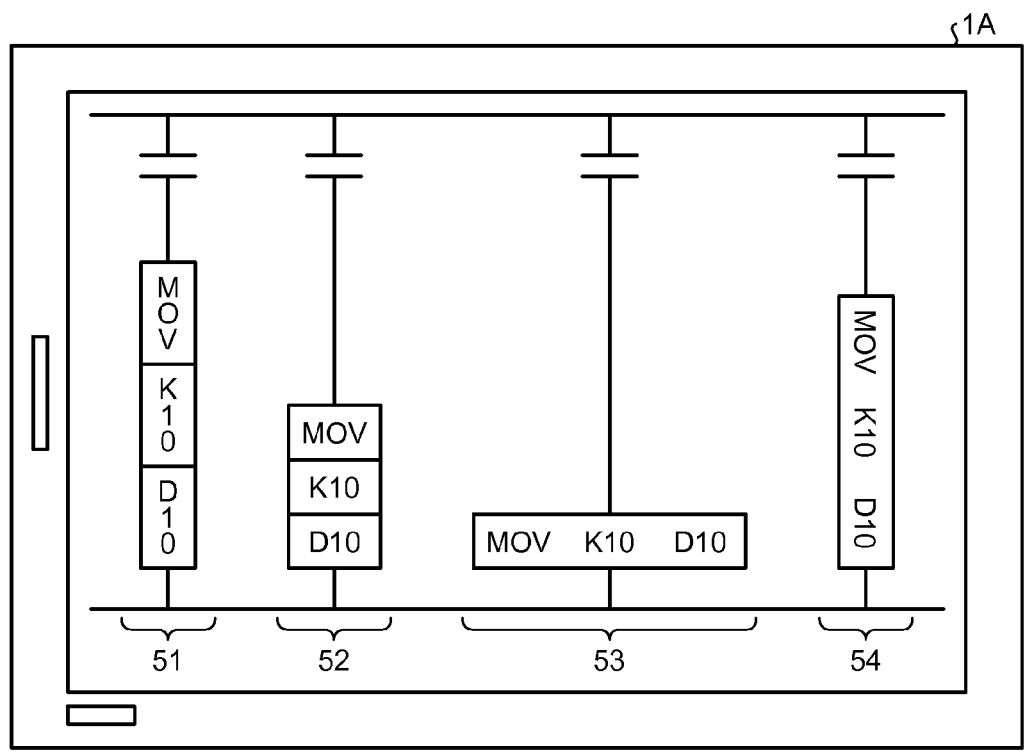
FIG. 11 is a diagram illustrating circuit display examples when a ladder program is displayed vertically.

FIG. 11 is a diagram illustrating circuit display examples when a ladder program is displayed vertically. In FIG. 11, the longitudinal direction is a direction parallel to the column direction of the ladder program and the lateral direction is a direction perpendicular to the column direction of the ladder program.

The display control unit 16 may arrange each circuit (command), such as "MOV" from which the ladder program is configured, such that characters are arranged in the longitudinal direction and circuits are arranged in the longitudinal direction, as in a circuit display example 51. The display control unit 16 may arrange each circuit such that characters are arranged in the lateral direction and circuits are arranged in the longitudinal direction, as in a circuit display example 52.

The display control unit 16 may arrange each circuit such that characters are arranged in the lateral direction and circuits are arranged in the lateral direction, as in a circuit display example 53, or the display control unit 16 may arrange a circuit display example that is obtained by rotating the circuit display example 53 90° clockwise, as a circuit display example 54. The circuit display example 54 is obtained by rotating a circuit display example in which characters are arranged in the lateral direction and circuits are arranged in the lateral direction to arrange the circuit display example in the column direction.

Figure 12:
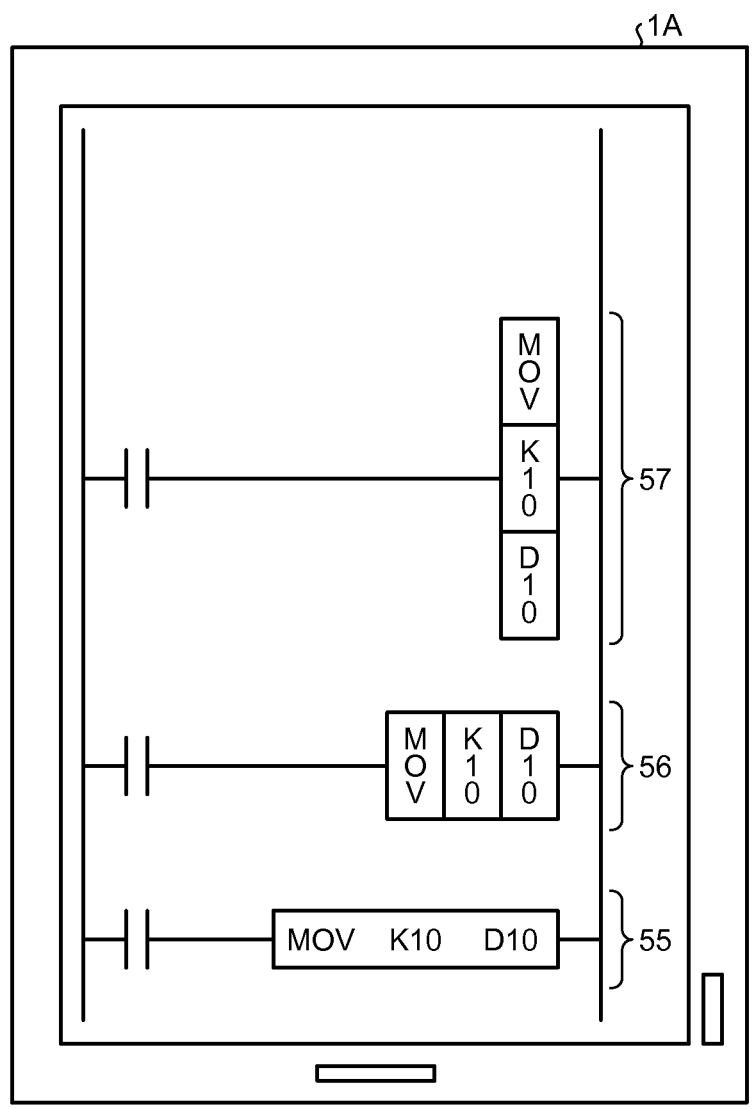
FIG. 12 is a diagram illustrating circuit display examples when a ladder program is displayed horizontally.

The circuit display examples 51 to 54 illustrated in FIG. 11 may be used when a ladder program is displayed horizontally. FIG. 12 is a diagram illustrating circuit display examples when a ladder program is displayed horizontally. In FIG. 12, the lateral direction is a direction parallel to the line direction of the ladder program and the longitudinal direction is a direction perpendicular to the line direction of the ladder program. Circuit display examples 55 to 57 in FIG. 12 respectively correspond to circuit display examples obtained by displaying the circuit display examples 51 to 53 in FIG. 11 horizontally.

The display control unit 16 may arrange each circuit, such as "MOV" from which the ladder program is configured, such that characters are arranged in the lateral direction and circuits are arranged in the lateral direction, as in the circuit display example 55. The display control unit 16 may arrange each circuit such that characters are arranged in the longitudinal direction and circuits are arranged in the lateral direction, as in the circuit display example 56.

The display control unit 16 may arrange each circuit such that characters are arranged in the longitudinal direction and circuits are arranged in the longitudinal direction, as in the circuit display example 57. The circuit display example 57 has the same display form as the circuit display example 51 and the circuit display example 55 has the same display form as the circuit display example 53. The circuit display example 55 is the same as a circuit display example obtained by displaying the circuit display example 54 horizontally.

The display control unit 16, for example, selects a circuit display method with which the ladder program can be displayed in a region that is as narrow as possible. In other words, the display control unit 16 sets, for each line or each column of a ladder program, the direction in which characters indicating functions of circuits (parts) are arranged and the direction in which circuits are arranged such that as much of the ladder program can be displayed on the display screen as possible.

The display control unit 16 may combine a plurality of circuit display methods. The display control unit 16 causes circuits to be displayed in the narrowest region by setting any of the circuit display examples 51 to 54 for each column of a ladder program and combining the circuit display examples 51 to 54. Alternatively, the display control unit 16 causes circuits to be displayed in the narrowest region by setting any of the circuit display examples 55 to 57 for each line of a ladder program and combining the circuit display examples 55 to 57.

Figure 13:
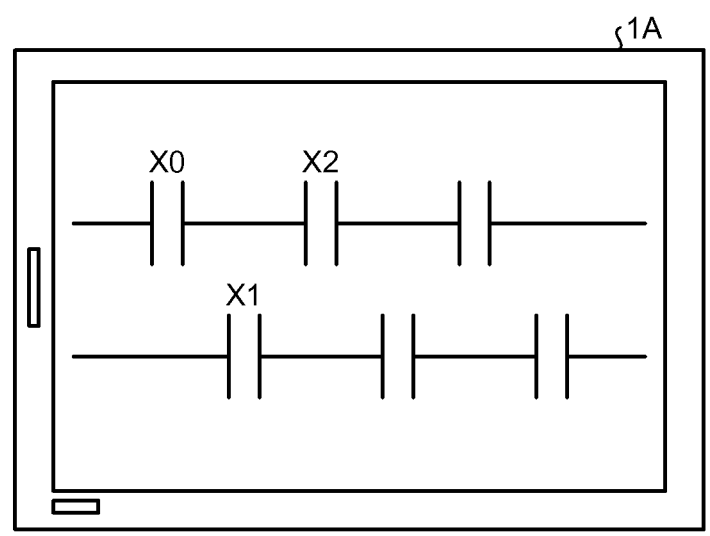
FIG. 13 is a diagram illustrating a circuit arrangement example in a ladder program.

FIG. 13 is a diagram illustrating a circuit arrangement example in a ladder program. FIG. 13 illustrates the circuit arrangement example when the ladder program is displayed horizontally. The display control unit 16 may arrange the circuits (such as circuits X0 to X2) from which the ladder program is configured in a staggered manner such that the positions of the circuits are shifted in the lateral direction on each line. For example, the display control unit 16 arranges the circuits X0 to X2 such that the position between the circuit X0 and the circuit X2, which are arranged on the first line, in the lateral direction matches the position of the circuit X1, which is arranged on the second line, in the lateral direction.

The circuit arrangement example illustrated in FIG. 13 may be used when the ladder program is displayed vertically. In this case, the circuits from which the ladder program is configured are arranged in a staggered manner such that the positions of the circuits in the longitudinal direction are shifted on each column.

An explanation will be given here of a method of arranging circuits in a ladder program in a staggered manner on each line with reference to FIGS. 14-1 and FIG. 14-2. For example, the display control unit 16 can arrange the lines in the ladder program in a staggered manner by setting lattice regions (circuit arrangement lattices), which are virtual grids in which circuits in the ladder program are to be arranged, in a rectangular shape and shifting the positions of the circuit arrangement lattices by half the length of the circuit arrangement lattice in the lateral direction on each line.

Figures 1, 14:
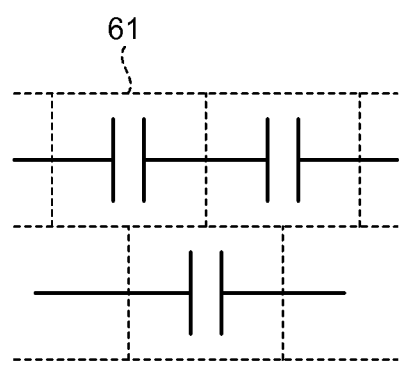
Figures 2, 14:
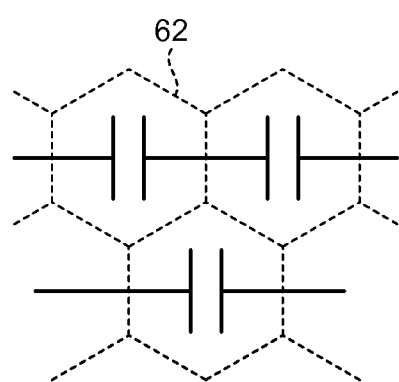

FIG. 14-1 is a diagram illustrating rectangular circuit arrangement lattices that are shifted on each line. The display control unit 16 arranges rectangular circuit arrangement lattices 61 in the lateral direction on each line. Then, the display control unit 16 shifts the positions of the circuit arrangement lattices 61 by half the length of the circuit arrangement lattice 61 on each line. Accordingly, the display control unit 16 can arrange the ladder program in a staggered manner.

Moreover, the display control unit 16 can arrange the lines in the ladder program in a staggered manner by setting lattice regions (circuit arrangement lattices) (virtual grids) in which circuits in the ladder program are to be arranged in a hexagonal shape and shifting the positions of the circuit arrangement lattices by half the length of the circuit arrangement lattice in the lateral direction on each line.

FIG. 14-2 is a diagram illustrating hexagonal circuit arrangement lattices that are shifted on each line. The display control unit 16 arranges hexagonal circuit arrangement lattices 62 in the lateral direction on each line. Then, the display control unit 16 shifts the positions of the circuit arrangement lattices 62 by half the length of the circuit arrangement lattice 62 in the lateral direction on each line. Accordingly, the display control unit 16 can arrange the ladder program in a staggered manner.

With FIGS. 14-1 and FIG. 14-2, an explanation has been given of a case where the apexes of the circuit arrangement lattices are arranged continuously; however, the apexes of the circuit arrangement lattices may be arranged discretely. In this case, the circuit arrangement lattices are arranged on each line with a predetermined interval therebetween.

The display control unit 16 may arrange each circuit without setting circuit arrangement lattices. Even in such a case, the display control unit 16 arranges each circuit such that the ladder program is arranged in a staggered manner.

Moreover, the display control unit 16 may prepare a plurality of layers, on each of which circuits are to be arranged, and arrange the circuits in each layer so as to arrange the ladder program in a staggered manner. For example, the display control unit 16 prepares a first layer that is used for the circuits constituting the first line to be arranged thereon and a second layer that is used for the circuits constituting the second line to be arranged thereon. Then, the display control unit 16 arranges the circuits in each layer such that the ladder program is arranged in a staggered manner between the first layer and the second layer.

Moreover, the display control unit 16 may display each line of a ladder program three dimensionally. Moreover, the display control unit 16 may display a ladder program such that when the ladder program is viewed through a stereopticon, each line of the ladder program can be stereoscopically displayed.

Figure 15:
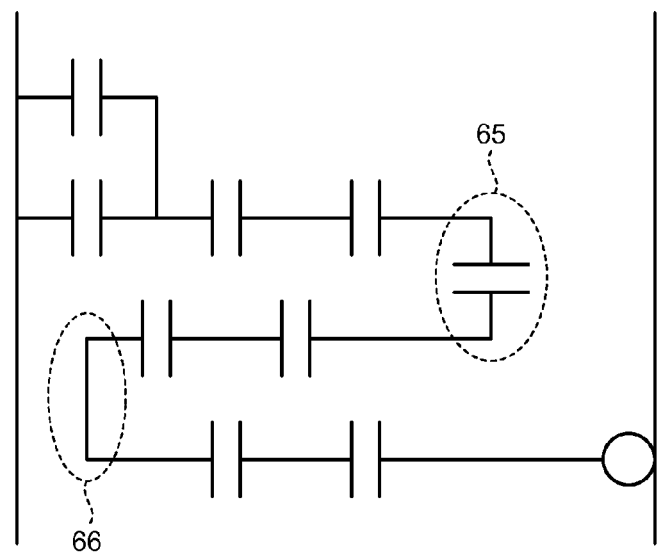
FIG. 15 is a diagram illustrating circuit arrangement in the case where a ladder program is displayed in a bent state.

Moreover, the display control unit 16 may display a ladder program horizontally and bend the ladder program at a predetermined position without one line of the ladder program being disconnected. FIG. 15 is a diagram illustrating circuit arrangement in the case where a ladder program is displayed in a bent state.

It is conventional for a ladder program that cannot be written within one line to be wrapped so as to be displayed (broken so as to be displayed in a plurality of lines). In the present embodiment, the display control unit 16 displays a ladder program that cannot be written within one line by bending it in the longitudinal direction and then bending it again in the lateral direction.

FIG. 15 illustrates a case where the ladder program is bent in the longitudinal direction at positions 65 and 66 so as to be displayed. The display control unit 16 bends the ladder program that is displayed horizontally at the position 65 so as to cause the ladder program to be displayed vertically and restores the ladder program such that it is displayed horizontally in the portion after the position 65. Furthermore, the display control unit 16 bends the ladder program that is restored such that it is displayed horizontally at the position 66 so as to cause the ladder program to be displayed vertically and restores the ladder program such that it is displayed horizontally in the portion after the position 66.

In this manner, the display control unit 16 causes one ladder program to be displayed on the display screen in a state of being bent and connected somewhere along the ladder program. The display control unit 16 may bend the ladder program any number of times. For example, the display control unit 16 bends the ladder program such that the number of times the ladder program is bent is reduced as much as possible. Consequently, it is possible to display the ladder program in a narrow region.

The display control unit 16 may arrange circuits in a ladder program at positions at which the ladder program is displayed vertically. FIG. 15 illustrates a case where a circuit is arranged at the position 65 at which the ladder program is displayed vertically.

Figure 16:
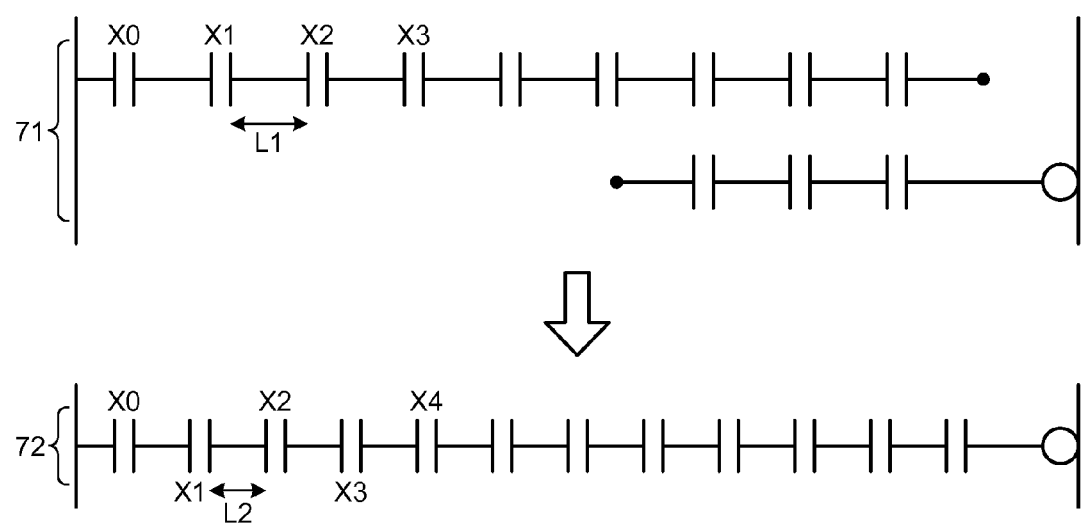
FIG. 16 is a diagram for explaining the process of eliminating wrapping of a ladder program.

The display control unit 16 may eliminate wrapping of a ladder program by reducing the distance between circuits arranged in the same line. FIG. 16 is a diagram for explaining the process of eliminating wrapping of a ladder program. A ladder program 71 illustrated in the upper portion of FIG. 16 is such that the distance between the circuits is set to a distance L1. Because the number of circuits in the ladder program is larger than a preset number (the number of circuits to be displayed per line), the ladder program is wrapped so as to be displayed.

As illustrated in the lower portion of FIG. 16, the display control unit 16 changes the distance between the circuits to a distance L2, which is smaller than the distance L1. Accordingly, the display control unit 16 generates a ladder program 72 in which the wrapping in the ladder program 71 is eliminated. Elimination of the wrapping makes it possible to display the ladder program in a region narrower than that in the case where the ladder program is wrapped so as to be displayed.

The display control unit 16 may arrange characters or the like added to circuits alternately on the upper side and on the lower side of the circuits. For example, when the characters "X0", "X1", "X2", and "X3" are arranged on the corresponding circuits in order on the line, the display control unit 16 arranges "X0" on the upper side of the first circuit and arranges "X1" on the lower side of the second circuit. Furthermore, the display control unit 16 arranges "X2" on the upper side of the third circuit and arranges "X3" on the lower side of the fourth circuit. In other words, the display control unit 16 arranges characters on the upper side of odd-numbered circuits and arranges characters on the lower side of even-numbered circuits. The display control unit 16 may arrange characters on the upper side of even-numbered circuits and arranges characters on the lower side of odd-numbered circuits.

For example, when the distance between the circuits is changed to the distance L2, which is smaller than the distance L1, the display control unit 16 arranges characters or the like added to the circuits alternately on the upper side and on the lower side of the circuits on the line. For example, even when the display control unit 16 does not change the distance between circuits so that the distance remains the distance L1, the display control unit 16 may arrange characters or the like added to the circuits alternately on the upper side and on the lower side of the circuits on the line.

The display control unit 16 may reduce the display region of a ladder program by changing the distance between lines in the ladder program to be narrower than the distance set by default. The display methods explained in FIG. 15 and FIG. 16 may be used for a ladder program that is displayed vertically.

Figure 17:
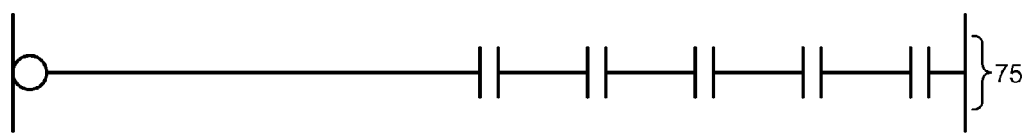
FIG. 17 is a diagram illustrating a display example of a ladder program when contacts in the ladder program are displayed from the right side.

When a ladder program is displayed horizontally, the display control unit 16 may display contacts from the right side and display coils from the left side. FIG. 17 is a diagram illustrating a display example of a ladder program when the contacts in the ladder program are displayed from the right side. The display control unit 16 displays the contacts in a ladder program 75 from the right side and displays the coils in the ladder program 75 from the left side. Consequently, it is possible to improve the legibility of the ladder program 75 with respect to users who write from right to left.

The display control unit 16 may combine the display methods of the circuits explained in FIG. 12 to FIG. 16. In this case, the display control unit 16 sets the priority for each display method in advance. For example, when wrapping in the ladder program is not eliminated even if the distance between circuits is reduced, the display control unit 16 displays the ladder program in a bent state.

In this manner, according to the third embodiment, the ladder program that is displayed in a wide region is caused to be displayed in a narrow region by changing, for example, the positions at which circuits in the ladder program are arranged; therefore, a large amount of information can be displayed on the display screen without reducing the legibility.

INDUSTRIAL APPLICABILITY

As described above, the ladder program display device and the ladder program display method according to the present invention are suitable for displaying a ladder program.

REFERENCE SIGNS LIST 1A to 1C ladder program display device, 11 arrangement-orientation detecting unit, 12A, 12B condition setting unit, 15A, 15B display-direction determining unit, display control unit, 17A, 17B display-direction changing unit, 18 display unit, 21 editing unit, 30 display screen, 31X, 31Y margin region, 61, 62 circuit arrangement lattice, 301 to 304 display screen.

The invention claimed is:
1. A ladder program display device comprising:
a display-direction determiner to determine whether a ladder program is caused to be displayed in a writing display direction that corresponds to vertical writing or horizontal writing; and a display to display the ladder program as vertical writing or horizontal writing in accordance with an instruction from the display-direction determiner, wherein the display-direction determiner to compare the number of columns of the ladder program to be displayed as the vertical writing and the number of lines of the ladder program to be displayed as the horizontal writing for each orientation of the display that is a portrait-oriented state or a landscape-oriented state, to select the writing display direction based on the comparison between the number of columns of the ladder program and the number of lines of the ladder program in response to the orientation of the display being changed, and to instruct the display to display the ladder program in the selected writing display direction, and wherein the selected writing display direction is a display direction of the vertical writing of the ladder program when the number of lines of the ladder program is smaller than the number of columns of the ladder program, and the selected writing display direction is a display direction of the horizontal writing of the ladder program when the number of columns of the ladder program is smaller than the number of lines of the ladder program.

2. The ladder program display device according to claim 1, wherein in a case where the orientation of the display unit is changed, when a line or a column of the ladder program that is not capable of being displayed is newly generated after the orientation is changed or when a margin region of the display screen after the orientation is changed becomes narrower than a margin region of the display screen before the orientation is changed as a result of maintaining the writing display direction before the orientation is changed, the display-direction determiner changes the writing display direction so that the writing display direction is different before and after the orientation is changed.

3. The ladder program display device according to claim 1, further comprising an arrangement-orientation detector to detect the orientation of the display that is the portrait-oriented state or the landscape-oriented state.

4. The ladder program display device according to claim 1, wherein when the number of columns of the ladder program to be displayed as the vertical writing is equal to the number of lines of the ladder program to be displayed as the horizontal writing, the display-direction determiner selects the writing display direction based on a comparison between a number of times the ladder program is wrapped to be displayed as the vertical writing and a number of times the ladder program is wrapped to be displayed as the horizontal writing.

5. The ladder program display device according to claim 4, further comprising an editor to edit the ladder program in accordance with an externally input instruction, wherein the display-direction determiner changes the writing display direction in response to wrapping newly occurring after the editor editing the ladder program.

6. A ladder program display device comprising:
a display controller to issue an instruction regarding arrangement positions at which parts of a ladder program are to be displayed; and
a display to display the ladder program in accordance with an instruction from the display controller, wherein
the display controller sets, for each line or each column of the ladder program, a first writing direction in which characters indicating functions of the parts are arranged and a second writing direction in which the parts are arranged based on a comparison between an information amount of the ladder program to be displayed as vertical writing and an information amount of the ladder program to be displayed as horizontal writing, each of the first writing direction and the second writing direction corresponding to vertical writing or horizontal writing, and wherein when the ladder program is displayed in the horizontal writing, the lines of the ladder program comprise:
a first line in which the characters are arranged in the vertical writing corresponding to the first writing direction, and the parts are arranged in the horizontal writing corresponding to the second writing direction; and
a second line in which the characters are arranged in the vertical writing corresponding to the first writing direction, and the parts are arranged in the vertical writing corresponding to the second writing direction.

7. The ladder program display device according to claim 6, wherein when the ladder program is displayed in the vertical writing, the columns of the ladder program comprise a column in which the characters are arranged in the vertical writing corresponding to the first writing direction, and the parts are arranged in the vertical writing corresponding to the second writing direction.

8. A ladder program display method comprising:
determining whether a ladder program is caused to be displayed in a writing display direction that corresponds to vertical writing or horizontal writing; and
displaying the ladder program as vertical writing or horizontal writing in accordance with the determined writing display direction, wherein
the determining includes comparing the number of columns of the ladder program to be displayed as the vertical writing on a display and the number of lines of the ladder program to be displayed as the horizontal writing on the display for each orientation of the display that is a portrait-oriented state or a landscape-oriented state, and
selecting the writing display direction based on the comparison between the number of columns of the ladder program to be displayed and the number of lines of the ladder program to be displayed in response to the orientation of the display being changed, wherein
the selected writing display direction is a display direction of the vertical writing of the ladder program when the number of lines of the ladder program is smaller than the number of columns of the ladder program, and the selected writing display direction is a display direction of the horizontal writing of the ladder program when the number of columns of the ladder program is smaller than the number of lines of the ladder program.

9. A ladder program display device comprising:
a display-direction determiner to determine whether a ladder program is caused to be displayed in a writing display direction that corresponds to vertical writing or a horizontal writing; and
a display to display the ladder program as vertical writing or horizontal writing in accordance with an instruction from the display-direction determiner, wherein
the display-direction determiner to compare the ladder program to be displayed as the vertical writing and the ladder program to be displayed as the horizontal writing for each orientation of the display that is a portrait-oriented state or a landscape-oriented state, to select the writing display direction based on a comparison between a first number of times the ladder program is wrapped to be displayed as the vertical writing and a second number of times the ladder program is wrapped to be displayed as the horizontal writing, and to instruct the display to display the ladder program in the selected writing display direction, and wherein the selected writing display direction is a display direction of the horizontal writing of the ladder program when the first number of times is larger than the second number of times, and the selected writing display direction is a display direction of the vertical writing of the ladder program when the second number of times is larger than the first number of times.

10. The ladder program display device according to claim 9, wherein when the first number of times is equal to the second number of times, the display-direction determiner selects the writing display direction in which as much of the ladder program is capable of being displayed on a display screen of the display as possible.

11. The ladder program display device according to claim 9, wherein in a case where the orientation of the display is changed, when a line or a column of the ladder program that is not capable of being displayed is newly generated after the orientation is changed or when a margin region of a display screen of the display after the orientation is changed becomes narrower than a margin region of the display screen before the orientation is changed as a result of maintaining the writing display direction before the orientation is changed, the display-direction determiner changes the writing display direction so that the writing display direction is different before and after the orientation is changed.

12. The ladder program display device according to claim 9, further comprising an arrangement-orientation detector to detect the orientation of the display that is a portrait-oriented state or a landscape-oriented state.

13. The ladder program display device according to claim 9, further comprising an editor to edit the ladder program in accordance with an externally input instruction, wherein the display-direction determiner changes the writing display direction in response to wrapping newly occurring after the editor editing the ladder program.

14. A ladder program display method comprising:

determining whether a ladder program is caused to be displayed in a writing display direction that corresponds to vertical writing or horizontal writing; and displaying the ladder program as vertical writing or horizontal writing in accordance with the determined writing display direction, wherein the determining includes comparing the ladder program to be displayed as vertical writing on a display and the ladder program to be displayed as horizontal writing on the display for each orientation of the display that is a portrait-oriented state or a landscape-oriented state, and selecting the writing display direction based on a comparison between a first number of times the ladder program is wrapped to be displayed as vertical writing and a second number of times the ladder program is wrapped to be displayed as horizontal writing, and wherein the selected writing display direction is a display direction of the horizontal writing of the ladder program when the first number of times is larger than the second number of times, and the selected writing display direction is a display direction of the vertical writing of the ladder program when the second number of times is larger than the first number of times.

* * * * *